(12) United States Patent
Ingemarsson et al.

(10) Patent No.: US 7,140,641 B2
(45) Date of Patent: Nov. 28, 2006

(54) SAFETY-BELT ARRANGEMENT

(75) Inventors: Anders Ingemarsson, Kungsbacka (SE); Fredrick Wigström, Floda (SE)

(73) Assignee: Autoliv Development AB, Vargarda (SE)

( * ) Notice: Subject to any disclaimer, the term of this patent is extended or adjusted under 35 U.S.C. 154(b) by 352 days.

(21) Appl. No.: 10/467,049

(22) PCT Filed: Jan. 25, 2002

(86) PCT No.: PCT/SE02/00119

§ 371 (c)(1),
(2), (4) Date: Nov. 19, 2003

(87) PCT Pub. No.: WO02/062630

PCT Pub. Date: Aug. 15, 2002

(65) Prior Publication Data
US 2004/0113409 A1   Jun. 17, 2004

(30) Foreign Application Priority Data
Feb. 6, 2001   (GB)   ................................. 0102926.3
Jun. 12, 2001  (GB)   ................................. 0114284.3

(51) Int. Cl.
*B60R 22/405*   (2006.01)
(52) U.S. Cl. ........................................ 280/805; 280/806
(58) Field of Classification Search ................ 280/805, 280/806, 807; 180/268, 273; 242/383, 374; 297/470, 480
See application file for complete search history.

(56) References Cited

U.S. PATENT DOCUMENTS

| | | | |
|---|---|---|---|
| 3,918,545 A | 11/1975 | Andres et al. | |
| 4,655,312 A | 4/1987 | Frantom et al. | |
| 5,224,736 A | 7/1993 | Sedlmayr et al. | |
| 5,552,986 A | 9/1996 | Omura et al. | |
| 5,607,118 A | 3/1997 | Dybro et al. | |
| 5,667,246 A | 9/1997 | Miller, III | |
| 5,700,034 A | 12/1997 | Lane, Jr. | |
| 5,785,347 A * | 7/1998 | Adolph et al. | ............... 280/735 |
| 5,799,893 A * | 9/1998 | Miller et al. | ............. 242/379.1 |
| 5,820,056 A * | 10/1998 | Dybro et al. | ................ 242/374 |
| 5,873,599 A * | 2/1999 | Bauer et al. | ................. 280/806 |
| 6,053,532 A * | 4/2000 | Wilkins et al. | ............. 280/806 |
| 6,209,916 B1 | 4/2001 | Smithson et al. | |
| 6,290,159 B1 * | 9/2001 | Specht et al. | ............. 242/379.1 |
| 6,513,616 B1 | 2/2003 | Bacher et al. | |
| 6,616,081 B1 | 9/2003 | Clute et al. | |
| 6,705,559 B1 * | 3/2004 | Sullivan et al. | ............. 242/381 |
| 6,726,249 B1 | 4/2004 | Yano et al. | |
| 6,834,822 B1 | 12/2004 | Koning et al. | |
| 6,871,877 B1 | 3/2005 | Hermann et al. | |
| 6,908,112 B1 | 6/2005 | Yano et al. | |

(Continued)

FOREIGN PATENT DOCUMENTS

DE        38 28 072        11/1989

(Continued)

*Primary Examiner*—David R. Dunn
(74) *Attorney, Agent, or Firm*—Madson & Austin

(57) ABSTRACT

A safety-belt arrangement for use in a motor vehicle has a safety-belt (5), one end of which is connected to a retractor (8), a sensor (11) generates a signal representative of the amount of safety-belt paid-out from the retractor. A force limiter (10) is associated with the retractor to permit safety-belt to be paid-out with a variable force limiting effect. A control arrangement (12) changes the level of force applied by the force limiter (10) in dependence upon the length of safety-belt paid-out from the retractor.

23 Claims, 4 Drawing Sheets

U.S. PATENT DOCUMENTS

| | | |
|---|---|---|
| 6,969,022 B1 | 11/2005 | Bell et al. |
| 2003/0201357 A1 | 10/2003 | Koning et al. |
| 2005/0284978 A1 | 12/2005 | Zolkower |

FOREIGN PATENT DOCUMENTS

| | | |
|---|---|---|
| DE | 199 56 530 | 6/2000 |
| DE | 199 22 720 | 11/2000 |
| DE | 199 27 427 | 1/2001 |
| EP | 0 656 283 | 6/1995 |
| EP | 0 878 364 | 11/1998 |
| EP | 1 060 961 | 12/2000 |
| EP | 1 149 743 | 10/2001 |
| EP | 1 022 201 | 7/2003 |
| JP | 11-147450 | 6/1999 |
| WO | WO-96/04154 | 2/1996 |
| WO | WO 00/38958 | 7/2000 |

* cited by examiner

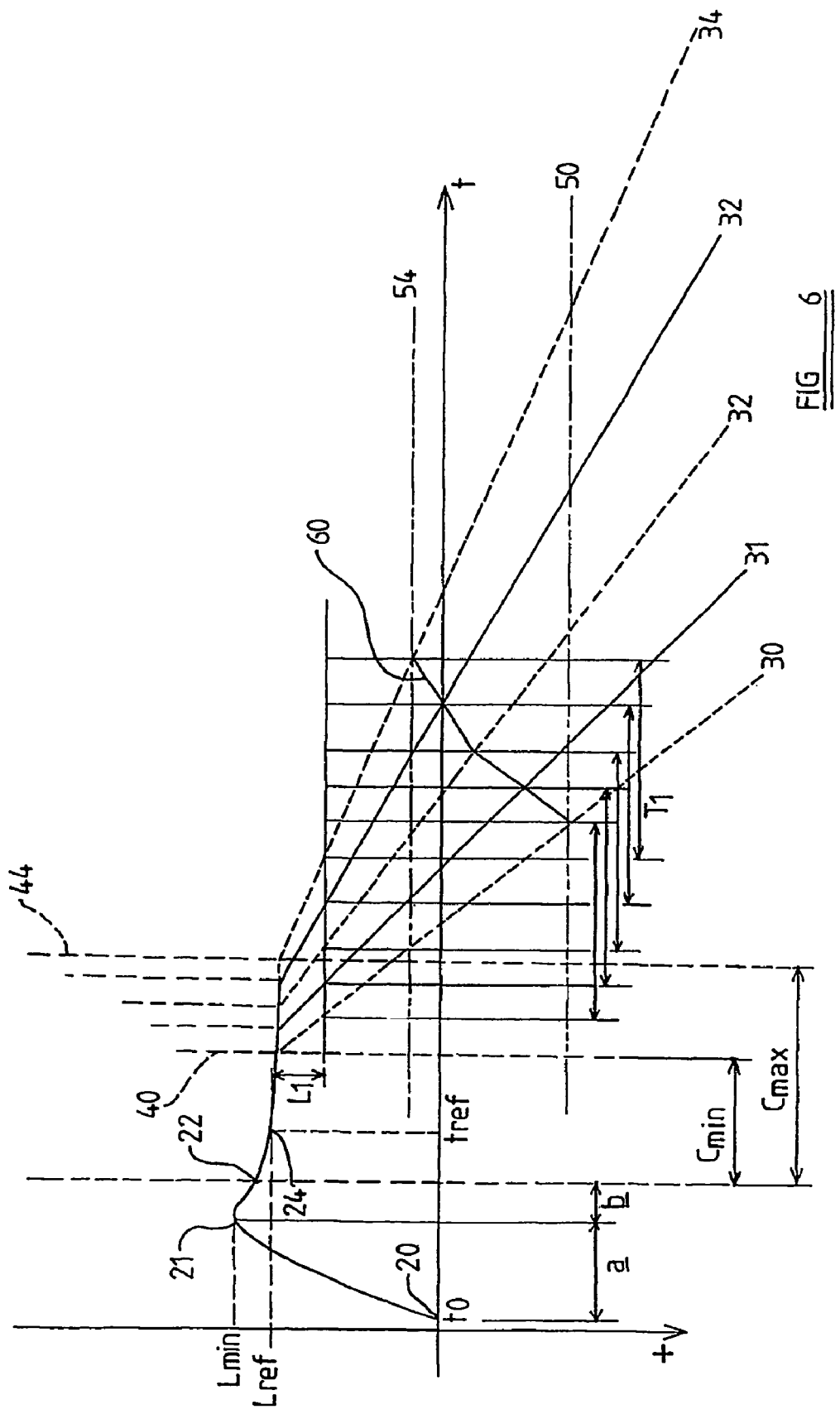

SAFETY-BELT ARRANGEMENT

BACKGROUND OF THE INVENTION

1. Field of the Invention

THE PRESENT INVENTION relates to a safety-belt arrangement, and more particularly relates to a safety-belt arrangement intended for use in a motor vehicle.

2. Description of Related Art

A simple safety-belt arrangement, as in widespread use, comprises a lap-and-diagonal safety-belt arrangement, (or "three-point" safety-belt) with one end of the safety-belt being anchored to part of the vehicle, an intermediate part of the safety-belt being provided with a tongue releasably engageable with a fixed buckle, and the other end of the safety-belt, which may pass through a pillar-loop, being wound on to the spindle of a retractor. The retractor incorporates a mechanism which locks the spindle of the retractor to prevent further safety-belt being paid out from the retractor when an accident or a potential accident situation is sensed. If the safety-belt is locked in this way, however, the safety-belt can, in certain circumstances, apply a very great retarding force to the occupant of the vehicle, decelerating the occupant very swiftly, and also possibly injuring the occupant.

Thus it has been proposed to provide a force limiter in a safety-belt system, the force limiter being adapted to enable a certain length of safety-belt to be paid-out, with a force limiting or energy absorbing effect, when very high forces are applied to the safety-belt.

It has been proposed to provide an arrangement in which the force limiting effect can be varied, at the start of or during an accident situation, in dependence upon the load required to be absorbed by the safety-belt arrangement. An arrangement of this type is disclosed in WO 9749583-A in which the reel of a retractor is provided with a torsion element arrangement which provides the force limiting effect. The torsion element arrangement includes an axially extending torsion bar and a co-axial torsion sleeve. The torsion bar and the torsion sleeve each terminate with a portion having a respective toothed periphery which can be releasably engaged by a respective ratchet element. In this way the level of force of the force limiting effect can be selected, by selecting either the bar, or the sleeve, or both, to provide the force limiting effect.

It is desirable, in a typical accident situation, for the force limiter to provide a high force limiting effect during the initial stages of the accident, as the occupant of the seat begins to move forwardly relative to the chassis of the vehicle, and to provide a lower force limiting effect at a subsequent stage in the accident when the occupant has moved forwardly and begins to impact with an inflating air-bag. It has, therefore, been proposed to have an arrangement in which the force level (or energy absorbing level) of the force limiter is adjusted after a predetermined period of time has elapsed following the sensing of an accident or a potential accident situation, and thus after the pretensioner has been triggered. However, an arrangement of this type suffers from various disadvantages.

Many accidents start with minor or short interaction with a first object, such as an impact with a car having a relatively low speed, or an impact with the edge of the road, or a crash barrier, with this minor or short interaction being followed, some moments later, by a severe impact with a second object, such as an on-coming high speed car, a tree or a building. In such a situation the first interaction would be sensed by the sensor provided in the motor vehicle to detect an accident or a potential accident situation. The sensor may control various safety devices within the motor vehicle, such as a pre-tensioner and an air-bag, but would also start the operation of the timer associated with the force limiter.

In an accident of this type, the force limiter would exhibit a high level of force for a period of time following the minor or short interaction, but the occupant of the vehicle may not move forwardly at all, or may move forwardly only by a very short distance during this period of time. Before the severe impact with the second object, the timer may have timed-out, and thus the force limiter would only have the lower level of force. Then, when the severe impact occurs, which will cause the occupant to move forwardly, relative to the chassis, the level of force provided by the force limiter might well be too low to absorb all of the energy of the occupant before the occupant hits the steering wheel or the dashboard.

SUMMARY OF THE INVENTION

The present invention seeks to provide an improved safety-belt arrangement.

According to this invention there is provided a safety-belt arrangement for use in a motor vehicle, the safety-belt arrangement comprising a safety-belt, one end of which is connected to a retractor, a sensor adapted to generate a signal representative of the amount of the safety-belt paid-out from the retractor, a force limiter associated with the retractor adapted to permit the safety-belt to be paid-out with a variable force limiting effect, means to change the level of force applied by the force limiter, and a control unit to receive a signal from the sensor and to generate, at least partially in response to said signal, an output signal to control the means which change the level of force.

Preferably the retractor incorporates a pretensioner.

Conveniently the control unit generates said output signal in response to the amount of safety-belt paid-out in excess of the amount of safety-belt paid-out prior to activation of the pretensioner.

Alternatively the control unit generates said output signal in response to the amount of safety-belt paid-out in excess of the amount of safety-belt paid-out immediately after the pretensioner has been activated.

In a preferred embodiment means are provided to lock the safety-belt in response to a sensed parameter and the control unit generates said output signal at least partly in response to a predetermined amount of safety-belt being paid-out in excess of a reference length, means being provided to determine the reference length at or shortly after the instant of locking of the safety-belt.

In one embodiment a crash detector is provided and the means to determine the reference length are adapted to be actuated a predetermined period of time after the crash detector detects the crash.

The predetermined period may be 20 to 30 ms, and preferably is 20 ms.

Preferably the control unit is adapted to generate the control signal a predetermined period of time after the predetermined amount of safety-belt has been paid out.

In one embodiment means are provided to select the predetermined period of time in response to a signal indicative of the severity of the crash.

Conveniently a further sensor is provided to generate a signal representative of a parameter of the occupant, which signal is supplied to the control unit, the output signal of the control unit also being related to the signal from the second sensor.

In one embodiment the further sensor determines the weight of the occupant of the seat.

In another embodiment the further sensor is a capacitative sensor adapted to determine the water content of the occupant of the seat In a further embodiment the further sensor is an optical sensor adapted to determine a size parameter of the occupant of the seat.

Preferably the control unit is adapted to categorise an occupant, in response to the signal representative of a parameter, into one of a plurality of categories, the length of safety-belt necessary to be withdrawn to cause the change in the force limiting effect being dependent upon the category of the occupant of the seat.

Conveniently the said variable force limiting effect comprises a plurality of discrete force levels.

Preferably the force levels comprise two discrete force levels.

Advantageously a crash sensor is provided adapted to generate a signal representative of the crash severity, and the force limiting effect is adjusted to be a function of crash severity.

BRIEF DESCRIPTION OF THE DRAWINGS

In order that the invention may be more readily understood, and so that further features thereof may be appreciated, the invention will now be described, by way of example, with reference to the accompanying drawings in which:

FIG. 6 is another graphical Figure relating to a modified embodiment of the invention.

DETAILED DESCRIPTION OF THE INVENTION

Figure 1:
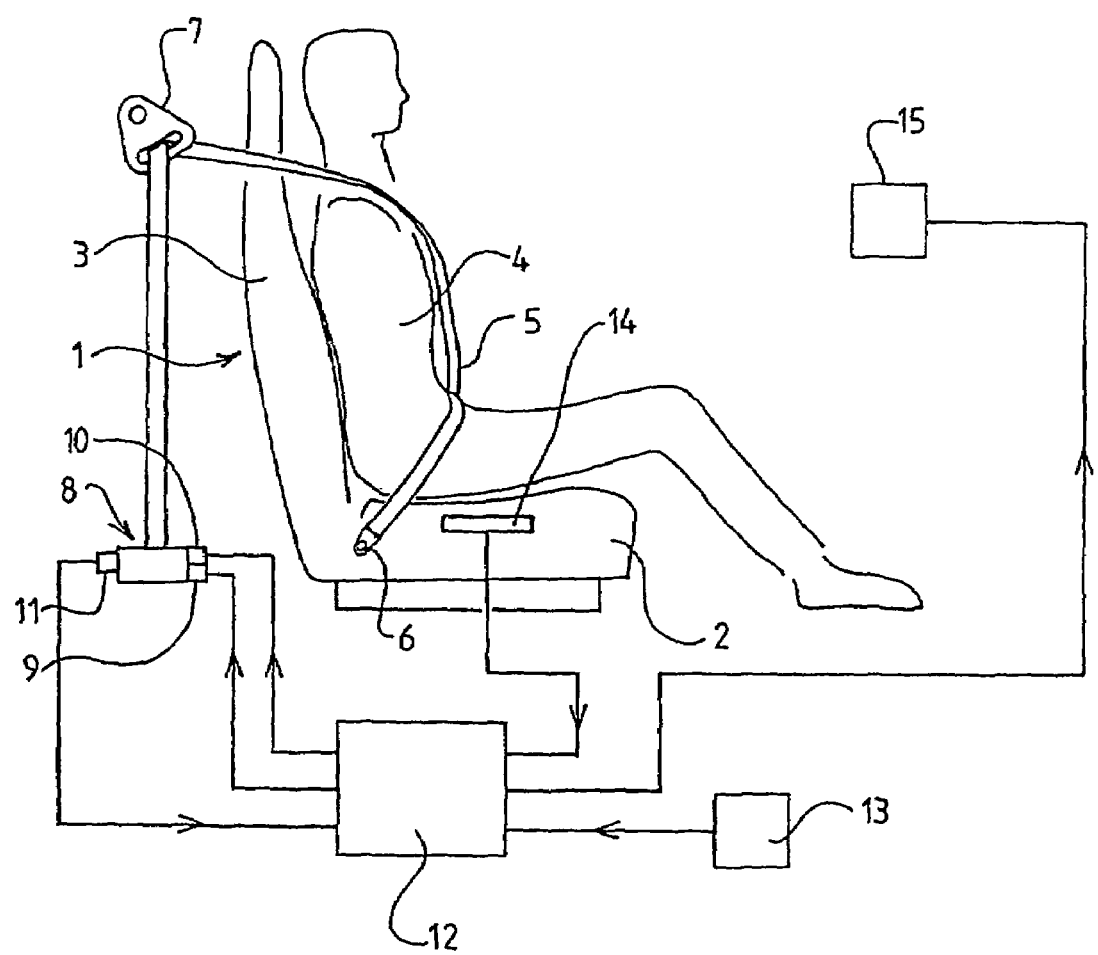
FIG. 1 is a diagrammatic figure illustrating one embodiment of the invention.

Referring initially to FIG. 1 of the accompanying drawings, a vehicle seat 1 having a seat squab 2 and a back-rest 3 is illustrated. The seat is occupied by an occupant 4. The occupant 4 is illustrated wearing a safety-belt that forms a safety-belt arrangement in accordance with the invention. The safety-belt comprises a webbing strap, one end of which is anchored to part of the vehicle seat. Not shown in FIG. 1 is a tongue which is mounted on the safety-belt and which is engaged releasably in a buckle provided on the other side of the seat. Part of the safety-belt 5 passes through a pillar-loop 7, and the other end of the safety-belt is connected to a floor mounted retractor 8. The retractor 8 is adapted to respond to an accident situation to lock a spool within the retractor to prevent further safety-belt being paid-out from the retractor, by locking in response to a sensed parameter such as a predetermined deceleration of the vehicle and/or in response to the speed of withdrawal of the safety-belt from the retractor. The retractor is provided with a pretensioner 9 which is adapted, in response to an accident situation being sensed, to rotate the spool of the retractor to wind in part of the safety-belt. Safety-belt arrangements having the features described above are well known and in common use. However, in this invention alternative mechanisms which lock the safety-belt in response to a sensed parameter may be used.

In the described embodiment the retractor 8 incorporates a variable force limiter 10. The force limiter 10 may be a continuously variable force limiter, such as an adjustable brake mechanism which acts on a disc or drum which co-rotates with the spool of the retractor mechanism, or may be a variable force limiter which provides a plurality of discrete force levels, such as a torsion element force limiter of the type disclosed in WO 9749583-A, as described above.

The retractor 8 is provided with a sensor 11 adapted to sense the amount of safety-belt that has been withdrawn from the retractor. Various types of sensors which perform this function have been proposed before, and any of these sensors may be used. EP 0 723 895 A discloses an arrangement in which a gear train is provided, driven by the spool of a retractor, which causes the rotation of an element which has a part spiral outer edge. A sensor has a spring-biased probe which engages the part spiral outer edge, so that as safety-belt is withdrawn from the retractor, the element with the part spiral outer edge rotates and the degree of movement of the probe is indicative of the length of safety-belt that has been withdrawn. In another prior proposed arrangement, an element which co-rotates with the spool is provided with a plurality of evenly spaced markings which are sensed by an optical sensor. The optical sensor generates a discrete pulse for each marking that passes the sensor. Appropriate circuitry connected to the sensor can determine the length of safety-belt that has been paid-out by determining the number of rotations, or part rotations, of the spool. A Hall effect sensor can also be used to determine the rotations of the spool when the spool is provided with a number of appropriately located magnets.

The output from the sensor 11 is provided to a central control unit 12. The central control unit 12, in the described embodiment, also receives signals from other sources. The control unit 12 receives signals from an accident sensor 13 in the form of an accelerometer. The accelerometer provides an output signal whenever deceleration in excess of a predetermined threshold is sensed. The accelerometer may also provide a signal which indicates the severity of the crash. Such an accident sensor 13 is conventional. The control unit 12 also receives signals from a further sensor arrangement, which signals are representative of a parameter of the occupant of the seat. In the described embodiment of the invention, a weight sensor 14 is provided which is incorporated within the squab 2 of the seat adapted to generate a signal indicative of the weight of the occupant 4. Such a sensor may include piezo-electric sensor devices. In alternative embodiments of the invention, the seat 1 may include a plurality of capacitative plates which are connected to appropriate circuitry, and which are adapted to determine the change in capacitance between the capacitative plates when the occupant of the seat positions himself on the seat. The change in capacitance is a function of the total water content of the occupant of the seat, which is closely related to the total weight of the occupant of the seat. Thus, by using an arrangement of this type, it is again possible to generate a signal which is at least approximately related to the weight of the occupant of the seat.

In yet a further embodiment of the invention, instead of determining the weight of the occupant of the seat, an optical system may be used which determines, optically, the size of the occupant or the size of at least part of the occupant. This, again, will generate a signal which is at least proportional to the weight of the occupant of the seat.

In the presently described embodiment, the control unit 12 is adapted to control not only the pre-tensioner and the force limiter, but also an air-bag 15, which is located in front of the occupant.

Whilst, in the described embodiment, the single control unit 12 controls a number of different items, in alternative embodiments of the invention, the control function may be divided up between a number of different independent control units.

As will become clear from the following description, in a safety-belt arrangement in accordance with the invention, a variable force limiting effect is provided, with the variation in the force limiting effect being controlled in response to the length of safety-belt that has been paid-out, rather than the time from the commencement of the accident or potential accident situation. Also, in preferred embodiments of the invention, the length of safety-belt that has to be paid-out to effect a change in the force limiting effect is determined in dependence upon sensed parameters of the occupant, and also possibly in response to a signal from the accelerometer indicating the degree of severity of the accident.

Figure 2:
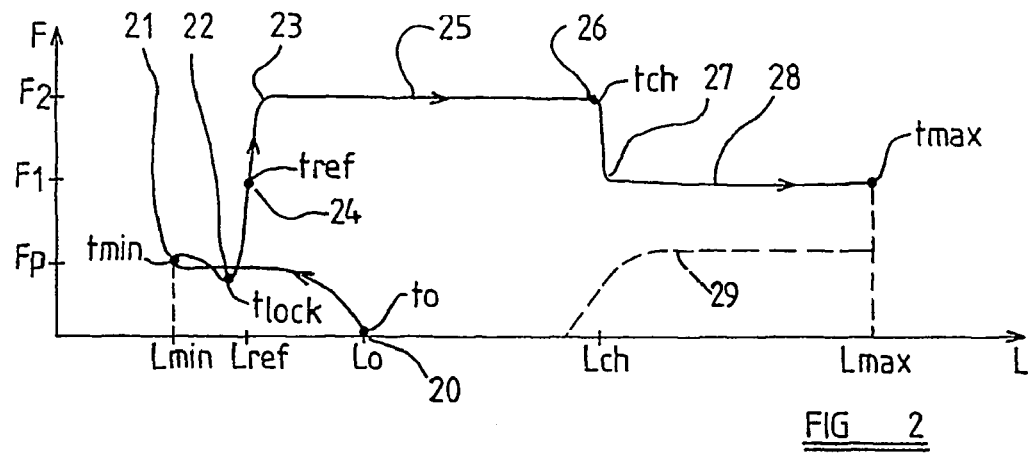
FIG. 2 is a graphical figure showing a plot of force applied to a safety-belt against the length of belt withdrawn for a typical person provided for purposes of explanation.
Figure 3:
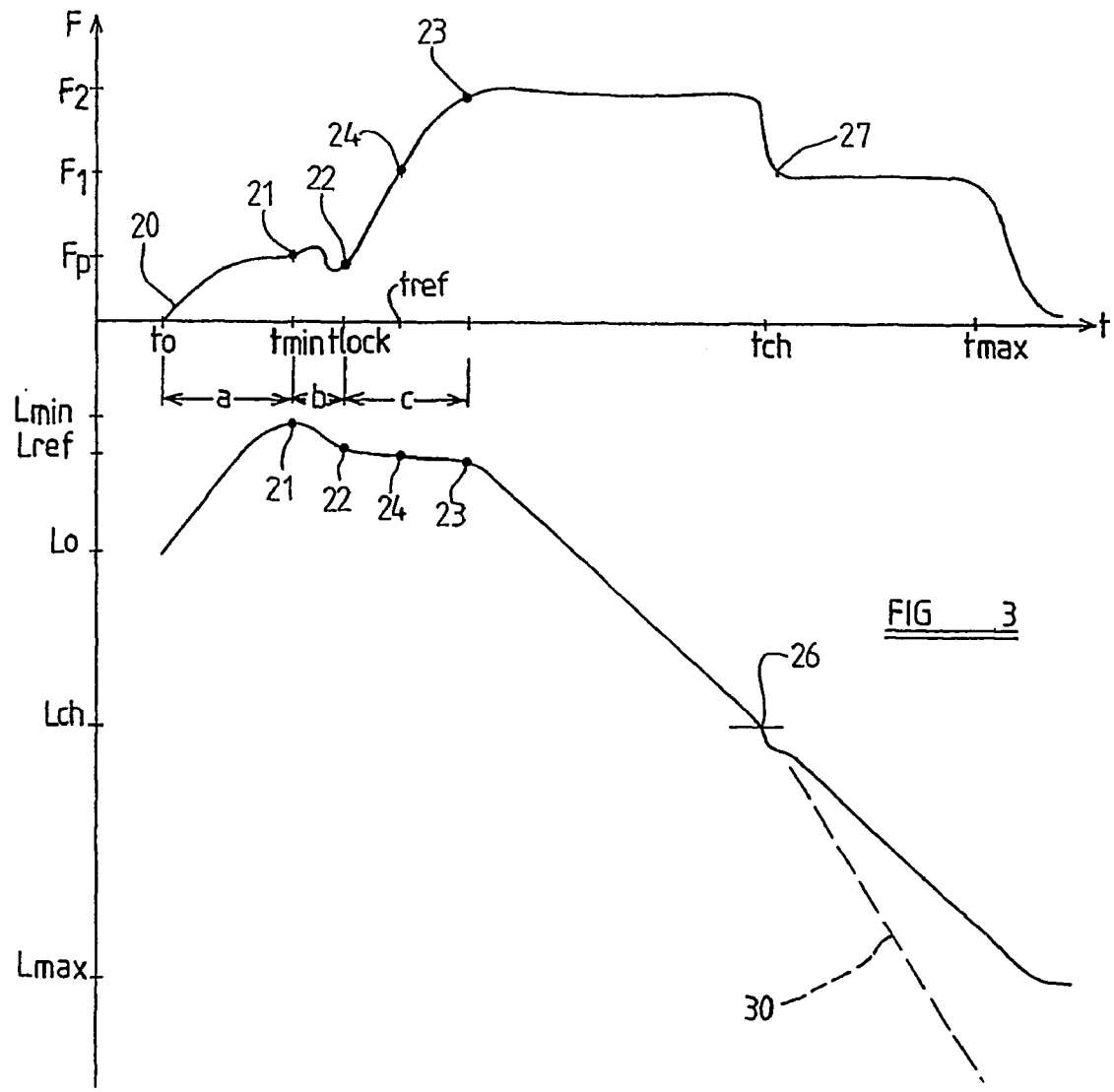
FIG. 3 is a graphical figure showing a plot of force applied to a safety-belt and length of belt extracted against time for a situation equivalent to that shown in FIG. 1.

Referring now to FIGS. 2 and 3, which is a graphical figure, the operation of the safety-belt arrangement of FIG. 1 in a typical accident for a person of typical or normal weight will be described. The graph of FIG. 2 is a plot of the force of the force limiting effect as plotted against the length of safety-belt withdrawn from the retractor. The graph of FIG. 3 is a plot of force and length of safety-belt withdrawn against time, with increasing length shown towards the foot of the page.

It can be seen that there are two predetermined retarding forces shown on the graph $F_1$ and $F_2$, the force $F_2$ being greater than the force $F_1$. These forces may, by way of example, be considered to be the forces provided by the torsion bar or the torsion tube, respectively, of an arrangement as shown in WO 9749583-A.

The accident situation commences at point 20 on the graph. At this stage a predetermined length of safety-belt has been withdrawn from the retractor. This is the length of safety-belt withdrawn as the occupant places the safety-belt in the position illustrated in FIG. 1. In this example this length of safety-belt is the length of safety-belt ordinarily deployed when the occupant who is of normal or typical size, is sitting comfortably in an upright position, and is identified as $L_0$. When an accident, or potential accident situation is sensed by the accelerometer 13, when the change in velocity of the vehicle exceeds a predetermined threshold, at time to, a signal from the control unit 12 is passed to the pretensioner 9 which is activated to wind in safety-belt on to the spool of the retractor 8. The spool of the retractor thus rotates and if desired the sensor 11 could sense that safety-belt is being wound in, against a gently increasing resistive force which gradually rises to a level $F_p$ until the point 21 is reached, when the safety-belt is fully tight around the occupant. The length of belt withdrawn from the retractor is now at a minimum $L_{min}$. The time is now $t_{min}$. The period of time between and $t_0$ and $t_{min}$ is a as shown in FIG. 3. This time period represents the time taken for the pretensioner to pretension the webbing. For the purposes of explanation, it will be assumed that the accident sensed by the accelerometer 13 is an initial impact with the side of the road or a crash barrier. The deceleration of the chassis of the vehicle is only very small, and thus the occupant does not move forward, relative to the chassis, by any noticeable distance as a consequence of the impact with the side of the road or the crash barrier. However, since the accident has been sensed by the accelerometer, the safety-belt has been tensioned by the pre-tensioner, and the occupant has been pulled backwardly, relative to the chassis, by the pre-tensioner.

When the pre-tensioner has finished pulling the webbing, the tension force on the webbing will reduce and due to the elasticity of the webbing, and also due to the elasticity of the clothes and body of the occupant, webbing will be paid-out. Thus, clothes of the occupant which were initially compressed during the pre-tensioning phase may now re-expand. Thus the length of safety-belt paid-out increases while the tension force on the safety-belt reduces.

As the webbing is paid-out, the locking mechanism of the retractor will operate, and the retractor will become locked at time $t_{lock}$ as shown at point 22 in FIG. 2. The period of time running from $t_{min}$ to $t_{lock}$ has a duration b as shown in FIG. 3.

At time instant $t_{lock}$, the retractor becomes locked by the locking mechanism that forms part of the retractor. Typically $t_{lock}$ may be 15 to 19 ms after $t_0$. The precise time period between $t_0$ and $t_{lock}$ may depend upon factors such as variations in the weight of the seat occupant, or the severity of the accident, but mainly upon the specific design and functioning of the pre-tensioner.

$t_{lock}$ may occur shortly before, simultaneously with, or shortly after the main impact of the accident presently being considered. During this main impact the chassis of the vehicle is subjected to severe deceleration, and possibly also acceleration in the rearward direction, especially if the impact is an impact with a high speed vehicle travelling in the opposite direction.

During this phase of the accident, the webbing of the safety-belt acts to decelerate the occupant, and possibly acts to accelerate the occupant rearwardly, depending upon the movement of the chassis. During this phase the force in the webbing is increased until the force reaches the higher level $F_2$. When the force reaches the level $F_2$, the force limiter starts to pay-out webbing. The rate at which the webbing is paid-out is related to the integral of the relative acceleration ($a_{rel}$) between the chassis and the occupant. The relative acceleration ($a_{rel}$) is the difference between the acceleration of the chassis ($a_c$) and the acceleration of the occupant ($a_O$). Thus:

$$a_{rel}=a_c-a_O.$$

The acceleration of the chassis is greater than or equal to the acceleration of the occupant. The acceleration of the occupant is related to the force level $F_2$ divided by the mass of the occupant. If the mass of the occupant is large, $a_O$ may be small, but $a_{rel}$ may be large. Thus typically webbing is paid-out at a higher rate for a heavier occupant.

The time period between $t_{lock}$ and the point where the resistive force $F_2$ is reached, point 23 as shown on the graph, has a duration c, and this time period is normally between 10 and 25 ms. This variation in time is typically due to the weight of the occupant, and the precise nature of the crash pulse, that is to say the period of time between the first impact and the main impact in the accident situation being considered, and also the degree of deceleration or rearward acceleration applied to the chassis to the vehicle in the particular crash situation.

It is thus to be understood that the period of time between $t_{lock}$ and the point 23, then the force $F_2$ is provided by the force limiter may, depending upon the precise circumstances, have a very different duration, with a short period of 10 ms being experienced in some situations, and a period of 100 ms being experienced in other situations.

During this phase, between $t_{lock}$ and point 23, however, the occupant of the seat will only move forwardly very little, and mainly due to the elasticity of the webbing.

During this phase, that is to say during the phase of movement with elastic stretching of the webbing following locking of the spool and before the occupant of the seat has stretched the webbing to such an extent that the full resistive force $F_2$ of the force-limiter is experienced, the sensor which senses the length of safety-belt that has been paid-out, takes a reference measurement at time $t_{ref}$ and effectively measures or sets a reference length of safety-belt that has been paid-out $L_{ref}$. This reference length is used as a start point when measuring a length of belt to be paid out against a specific resistive force $F_2$ as will now be described.

The point at which the reference measurement is made is shown as point 24 on the graph of FIG. 2. In making the measurement, $t_{ref}$ to be a selected period of time, preferably within the time period of 20–30 ms, most preferably within a time period of 20 ms, after $t_0$ to ensure that the time $t_{ref}$ will actually be in the time period c following $t_{lock}$, or, alternatively, the measurement at time $t_{ref}$ may be made in response to locking of the retractor reel.

If the occupant then moves forwardly, after the point 23 on the graph is reached, the resistive force $F_2$ is experienced as the safety-belt is paid-out. This is shown by the horizontal line 25 of the graph. The time taken for the occupant to move forwardly, against the resistive force, is not of any relevance since the resistive force $F_2$ will be enabled until a predetermined length of belt has been paid-out, with the length being measured from the reference length $L_{ref}$. After a predetermined length of safety-belt has been paid-out, as measured from the reference length, $L_{ref}$ at point 26 on the graph, and identified as $L_{ch}$, the force limiter 10 no longer provides the high resistive force $F_2$, but instead provides the lower resistive force $F_1$, as shown at point 27 on the graph. This can be visualised as changing from the torsion bar to the torsion tube of the arrangement of WO 9749583-A. Continued forward movement of the occupant is then effected against the much lower resistive force as shown at line 28. In a typical case, during this phase of movement of the occupant of the seat, energy is also being absorbed, as shown in phantom at line 29, by an inflating air-bag.

It is to be appreciated that the change of the force level of the force limiter occurs when a certain amount of safety-belt has been paid-out, from the measured length $L_{ref}$ and thus occurs when a certain amount of energy has been absorbed. In the arrangement described, the length of safety-belt that is paid-out is measured from a reference point which is effectively the length of safety-belt paid-out at the moment that the retractor is locked. As the length of belt withdrawn during the period of duration c between $t_{lock}$ and when force $F_2$ is achieved is very short, any reference measurement taken in this time period will be sufficiently accurate. The instant of this "locking" is slightly uncertain in time as regards the instant of initial sensing of an accident situation, and the instant at which the resistive force $F_2$ is achieved is more uncertain, and thus it is appropriate to use the moment at which the retractor becomes blocked, or an instant which is, in time, very shortly after to that moment, as a reference point at which to determine $L_{ref}$. Thus, provided that the distance $L_{ref}$ is determined during the time period between $t_{lock}$ and point 23 when the resistive force $F_2$ is achieved, the measured point $L_{ch}$ will be almost precisely at the desired position, and the energy absorbed before the change of force will therefore also be almost exactly the desired amount, regardless of the duration of the time after commencement of the accident before force $F_2$ is achieved. The energy absorbed is related to the length of belt withdrawn multiplied by the force.

The safety-belt is withdrawn until a maximum extension $L_{max}$ is achieved, at which point all of the kinetic energy of the occupant is absorbed. $L_{max}$ is selected so that the kinetic energy of the occupant is absorbed before the occupant actually reaches the steering wheel or windscreen.

The transition between the high energy absorbing level $F_2$ and the low energy absorbing level $F_1$, as shown at 26 and 27 on the graph, is effected when a predetermined length $L_{ch}$ of safety-belt has been paid out. That predetermined length of safety-belt is, as described, preferably measured from $L_{ref}$, but could alternatively be measured from $L_0$, the amount of safety-belt withdrawn from the retractor just before the commencement of the accident situation, or from $L_{min}$, the amount of safety-belt withdrawn from the retractor just after the pretensioner has pre-tensioned the safety-belt.

It is to be appreciated that during the final part of the withdrawal of the safety-belt, the occupant is restrained, not only by the safety-belt but also by the air-bag, and thus the speed of withdrawal of the safety-belt remains substantially constant, and the total retarding force applied to the occupant remains substantially constant. FIG. 3 shows, in phantom, at 30, the situation that would prevail if the air-bag did not inflate.

Figure 4:
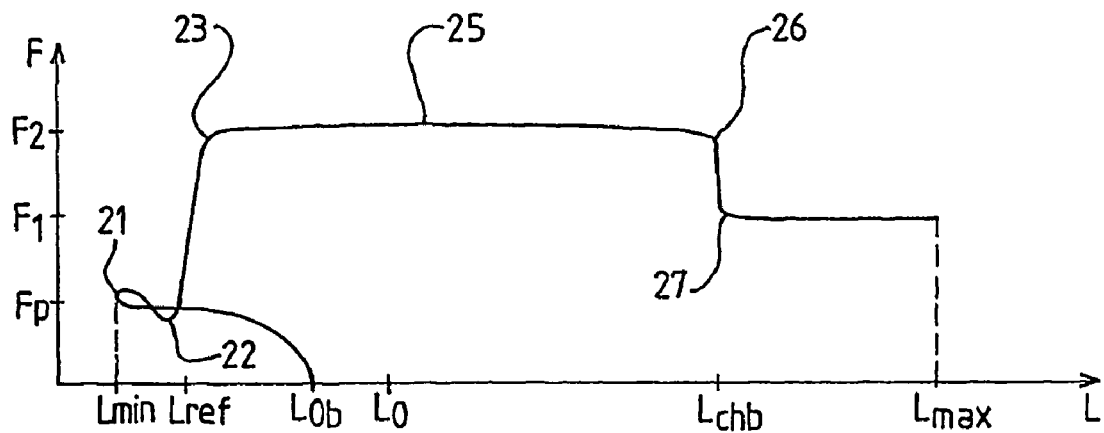
FIG. 4 is a further graphical figure corresponding to FIG. 2 for a heavy person.

It is preferred that when the occupant of the seat is a heavy or large occupant, the length of safety-belt is paid-out against the high resistive force should be somewhat greater than for an occupant of normal weight. FIG. 4 is therefore a graph corresponding to FIG. 2, and in which the same reference numerals have been utilised, but which relates to a heavy seat occupant.

As can be seen from FIG. 4, the initial point on the graph shows a length of belt $L_{ob}$ withdrawn from the spool, which is less than the length $L_0$ as withdrawn in FIG. 2. The reason for this is that with a heavy or large occupant, the vehicle seat will be moved further away from the steering wheel, meaning that less safety-belt has to be withdrawn initially. However, it can equally be seen that the distance between $L_{ob}$ and $L_{max}$ and also the distance between $L_{ref}$ and $L_{chb}$ is much greater than the equivalent distances in FIG. 2. The distance between $L_{ref}$ and $L_{chb}$ is greater, to enable more energy to be absorbed. The distances are, however, still such that at $L_{max}$ the occupant has not actually reached the steering wheel or windscreen.

Figure 5:
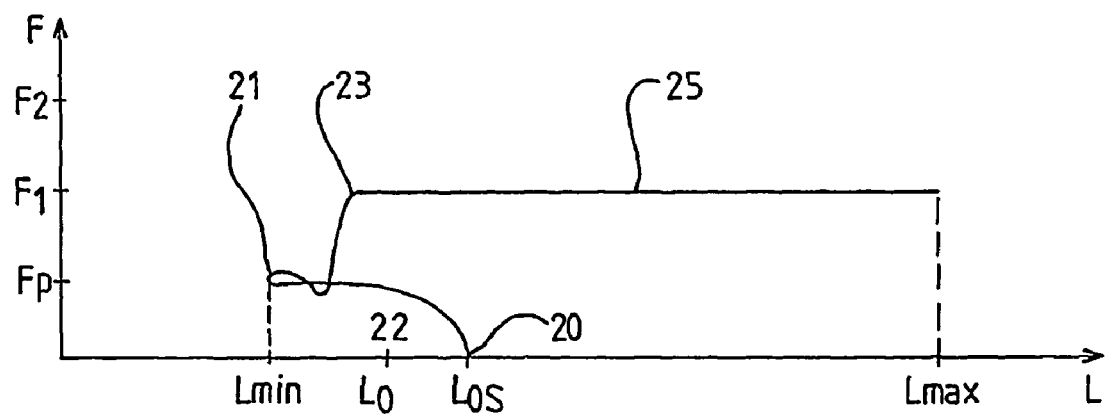
FIG. 5 is further graphical figure corresponding to FIGS. 2, 3 and 4 for a light person.

Referring now to FIG. 5 it is to be understood that for a light-weight occupant it may be desirable to omit the very strong energy absorbing force, and to use only the relatively low force. Thus, referring to FIG. 5, it is to be noted that the initial extension $L_{os}$ of safety-belt is greater than the extension $L_0$ of FIG. 2. The reason for this is that for a light-weight occupant the vehicle seat will be located closer towards the steering wheel than for an occupant of normal weight, meaning that more safety-belt will have to be withdrawn, initially, from the retractor for the safety-belt to be placed in position.

Following commencement of the accident at point 20, safety-belt is withdrawn from the initial extension $L_{os}$ to an extension $L_{min}$, as shown at point 21. During the main crash pulse, that is to say during the time period c, the safety-belt is pulled out from the retractor and the resistive force rises until it reaches the force level $F_1$ at 23. Subsequently the occupant can move forwardly withdrawing the safety-belt, as shown at 25, against the resistive force $F_1$ until the maximum extension of safety-belt $L_{max}$ is achieved. It is to be appreciated that much less energy is absorbed during the described procedure, since only the relatively low resistive force $F_1$ is utilised. However, with a light-weight occupant, this is a sufficient degree of energy absorption, since it is only necessary to use the higher force level $F_2$ for a person of normal, or above normal weight.

FIG. 6 is a graphical Figure which relates to an embodiment in which the control unit generates the control signal not only in response to a predetermined amount of safety-belt having been paid out after the retractor reel is locked, but in response to the paying out of a specific length of safety belt, and also a subsequent predetermined period of time. That period of time may be adjusted in response to sensed crash conditions, such that the period of time is related to the severity of the crash, and thus the described arrangement can provide an optimum effect. Thus, in this embodiment the control unit 12 will determine when a predetermined length ($L_1$) of safety belt has been paid out following $t_{ref}$ which is very shortly after locking of the retractor reel, and will then start an internal timer which times a predetermined time period ($T_1$) so that the control signal that causes the change of the resistive force from the higher level $F_2$ to the lower level $F_1$.

FIG. 6 shows, for a given severity of accident, the length of safety-belt withdrawn from the retractor reel of this embodiment plotted against time, with increasing length shown towards the front of the page, and thus the Figure has some similarity to that of FIG. 3. The length of safety-belt withdrawn from the retractor falls following the commencement of the accident at $t_0$ at point 20 on the graph. At point 21 the safety-belt is fully tight around the occupant of the vehicle, and time period a concludes and time period b begins. During time period b the occupant may move forwardly slightly in the seat and time period b ends at point 22 on the graph as the retractor reel locks at $t_{lock}$. Shortly after the reel locks at $t_{ref}$ as shown at point 24, the length of safety-belt $L_{ref}$ withdrawn from the retractor is determined or set. During the period of time following $t_{lock}$ the occupant continues to be pushed forwardly stretching the webbing against a restraining force that rises to the level $F_2$ during the time period c. This time period is relatively short for a heavy person, as exemplified by line 30, the time period being about 10 ms, as the high restraining force is reached quickly following the locking of the retractor. The time period c for the heavy person identified by line 30 terminates as shown by line 40, and then the safety-belt is pulled out against the retarding force $F_2$ and is identified as $C_{min}$. The line 50 shows the desired length $L_{ch}$ for a heavy person.

Looking now at the example of a light person, as indicated by the line 34, it can be seen that the time period c is relatively long, and does not end until the point indicated by the line 44. This time period is identified as $C_{max}$. The line 54 shows the desired length $L_{ch}$ for a light person.

It can be seen that if the time is measured between the point at which a predetermined length of safety-belt $L_1$ after $L_{ref}$ has been withdrawn, until the line representing the desired length $L_{ch}$ is reached, in each case the time is the same, namely $T_1$. It can also be seen that the same effect is observed for occupants of decreasing weight as indicated successively by the lines 31, 32 and 33. The desired length $L_{ch}$ for each example are shown to be interconnected by the line 60.

Thus, at least to a good approximation, the length $L_{ch}$ is reached after a first predetermined length $L_1$ of safety belt has been withdrawn, and a further length of belt has been withdrawn during a time period $T_1$. Consequently by determining when the length $L_1$ of safety-belt has been withdrawn, and then measuring the time $T_1$ to generate the control signal to effect the change of the resistive force it is not necessary to effect any measurement of any parameter of the occupant related to the size of the occupant, thus minimising the number of sensors that need to be provided.

The pay-out rate of the safety-belt will be higher for a more severe crash, and thus the described system is automatically adaptive to the severity of the crash. If the system is to be such that it responds and varies its performance not only in response to the severity of the crash, but also in dependence on the weight of the occupant, then the precise values of $L_1$ and $T_1$ may be varied in dependence on the sensed severity of the crash.

Whilst reference has been made, in connection with the graphs of FIGS. 3, 4, and 5 to different operating characteristics being provided depending upon the weight of the occupant of the seat, it is to be fully understood that these different characteristics may be provided in response to any sensed parameter which is related to the weight of the occupant of the seat such as a sensed parameter of the water content of the occupant of the seat, and a sensed parameter relating to the size of the occupant of the seat.

It is to be appreciated that in certain embodiments, the actual level of force exhibited by the force limiter may vary continuously, although in preferred embodiments of the invention, the force limit level can only change between a limited number of discrete levels. Whilst embodiments have been disclosed in which the force limit level can be changed between two discrete levels, it is to be understood that the force limit level can be changed between a plurality of discrete levels. It is to be appreciated that the force limit level actually exhibited by the force limiter may be determined as a function of the crash severity. Thus, in a very severe accident, an initial force limit level may be adopted which is a very high level, which can be visualised as using simultaneously both the torsion bar and the torsion tube of WO 9749583-A.

For simplicity of manufacture, the relationship between the weight or other parameter of the occupant and the functioning of the force limiter may be such that the force limiter has a restricted number of discrete modes of operation, such as, for example, three modes of operation as described. Thus, an occupant of a seat will be assessed, by the appropriate sensor, to determine which category of occupant is present in the seat, and thus which mode of operation is to be utilised.

Thus, in the example given, an occupant of a seat may be assessed as being "light", "normal weight" or "heavy", and the described arrangement will then function in the appropriate manner.

In the present Specification "comprises" means "includes or consists of" and "comprising" means "including or consisting of".

What is claimed is:

1. A safety-belt arrangement for use in a motor vehicle, the safety-belt arrangement comprising a safety-belt, one end of which is connected to a retractor, a sensor adapted to generate a signal representative of the amount of the safety-belt paid-out from the retractor, a force limiter associated with the retractor adapted to permit the safety-belt to be paid-out with a variable force limiting effect, means to change the level of force applied by the force limiter, and a control unit to receive a signal from the sensor and to generate, at least partially in response to said signal, an output signal to control the means which change the level of force, and wherein means are provided to lock the safety-belt in response to a sensed parameter and wherein the control unit generates said output signal at least partly in response to a predetermined amount of safety-belt being paid-out in excess of a reference length, wherein the sensor determines the reference length at or shortly after the instant of locking of the safety-belt.

2. An arrangement according to claim 1 wherein the retractor incorporates a pretensioner.

3. An arrangement according to claim 2 wherein the control unit generates said output signal in response to the amount of safety-belt paid-out in excess of the amount of webbing paid-out prior to activation of the pretensioner.

4. An arrangement according to claim 2 wherein the control unit generates said output signal in response to the amount of safety-belt paid-out in excess of the amount of safety-belt paid-out immediately after the pretensioner has been activated.

5. An arrangement according to claim 1 wherein a crash detector is provided and the means to determine the reference length are adapted to be actuated a predetermined period of time after the crash detector detects the crash.

6. An arrangement according to claim 5 wherein the predetermined period is 20 to 30 ms.

7. An arrangement according to claim 6 wherein the period is 20 ms.

8. An arrangement according to claim 1 wherein the control unit is adapted to generate the control signal a predetermined period of time after the predetermined amount of safety-belt has been paid out.

9. An arrangement according to claim 8 wherein means are provided to select the predetermined period of time and the predetermined amount of safety-belt in response to a signal indicative of the severity of the crash.

10. An arrangement according to claim 1 wherein a further sensor is provided to generate a signal representative of a parameter of the occupant, which signal is supplied to the control unit, the output signal of the control unit also being related to the signal from the second sensor.

11. An arrangement according to claim 10 wherein the further sensor determines the weight of the occupant of the seat.

12. An arrangement according to claim 10 wherein the further sensor is a capacitative sensor adapted to determine the water content of the occupant of the seat.

13. An arrangement according to claim 10 wherein the further sensor is an optical sensor adapted to determine a size parameter of the occupant of the seat.

14. An arrangement according to claim 10 wherein the control unit is adapted to categorize an occupant, in response to the signal representative of a parameter, into one of a plurality of categories, the length of safety-belt necessary to be withdrawn to cause the change in the force limiting effect being dependent upon the category of the occupant of the seat.

15. An arrangement according to claim 1 wherein the said variable force limiting effect comprises a plurality of discrete force levels.

16. An arrangement according to claim 15 wherein the force levels comprise two discrete force levels.

17. An arrangement according to claim 1 wherein a crash sensor is provided adapted to generate a signal representative of the crash severity, and the force limiting effect is adjusted to be a function of crash severity.

18. A safety-belt arrangement for use in a motor vehicle, the safety belt arrangement comprising:
   a safety-belt having an end;
   a retractor capable of paying out the safety belt, the end of the safety-belt connected to the retractor;
   a sensor capable of measuring an amount of safety-belt paid-out from the retractor, the sensor generating a corresponding signal;
   a force limiter associated with the retractor, the force limiter permitting the safety-belt to be paid-out with a variable force limiting effect, the force limiter having a force changing mechanism capable of changing the level of force applied by the force limiter;
   a control unit able to receive the signal from the sensor, the control unit generating an output signal to control the force changing mechanism in response to the sensor signal; and
   a locking mechanism for locking the safety-belt in response to a sensed parameter;
   wherein the sensor determines a reference length at or shortly after the instant of locking the safety-belt, and the control unit generates the output signal in response to a predetermined amount of safety-belt paid-out in excess of the reference length.

19. An arrangement according to claim 18, further comprising a crash detector for detecting a crash, wherein the sensor determines the reference length at a predetermined period of time after the crash is detected.

20. An arrangement according to claim 18, wherein the control unit is able to generate a control signal at a predetermined period of time after the predetermined amount of safety-belt has been paid-out.

21. An arrangement according to claim 20, wherein the control unit selects the predetermined period of time and the predetermined amount of safety-belt to be paid-out in response to a signal indicative of the severity of a crash.

22. An arrangement according to claim 18, wherein the force changing mechanism is a torsion element comprising a torsion bar and a torsion tube.

23. An arrangement according to claim 18, wherein the force changing mechanism is an adjustable brake mechanism.

* * * * *

UNITED STATES PATENT AND TRADEMARK OFFICE
CERTIFICATE OF CORRECTION

PATENT NO. : 7,140,641 B2
APPLICATION NO. : 10/467049
DATED : November 28, 2006
INVENTOR(S) : Anders Ingemarsson et al.

It is certified that error appears in the above-identified patent and that said Letters Patent is hereby corrected as shown below:

In column 4, line 20, please delete "spooi" and replace it with --spool--.

Signed and Sealed this

Thirty-first Day of July, 2007

JON W. DUDAS
*Director of the United States Patent and Trademark Office*